(12) United States Patent
Mitsubori

(10) Patent No.: US 9,202,199 B2
(45) Date of Patent: Dec. 1, 2015

(54) SECURE APPROVAL PROCESS

(71) Applicant: Toshiyuki Mitsubori, San Mateo, CA (US)

(72) Inventor: Toshiyuki Mitsubori, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 13/839,087

(22) Filed: Mar. 15, 2013

(65) Prior Publication Data

US 2014/0268243 A1  Sep. 18, 2014

(51) Int. Cl.
  *G06F 3/12* (2006.01)
  *G06Q 10/10* (2012.01)
  *H04N 1/42* (2006.01)
  *H04N 1/00* (2006.01)

(52) U.S. Cl.
  CPC ........... *G06Q 10/10* (2013.01); *H04N 1/00938* (2013.01); *H04N 1/42* (2013.01); *H04N 1/00225* (2013.01); *H04N 1/00474* (2013.01); *H04N 2201/0094* (2013.01)

(58) Field of Classification Search
  None
  See application file for complete search history.

(56) References Cited

U.S. PATENT DOCUMENTS

| | | | |
|---|---|---|---|
| 5,758,327 A * | 5/1998 | Gardner et al. | 705/26.82 |
| 6,704,906 B1 * | 3/2004 | Yankovich et al. | 715/222 |
| 6,910,018 B1 * | 6/2005 | Okada et al. | 705/26.2 |
| 7,000,179 B2 * | 2/2006 | Yankovich et al. | 715/222 |
| 7,657,554 B2 * | 2/2010 | Murphy et al. | 707/803 |
| 8,027,892 B2 * | 9/2011 | Baumann et al. | 705/34 |
| 8,788,945 B1 * | 7/2014 | Jesensky et al. | 715/745 |
| 2003/0110443 A1 * | 6/2003 | Yankovich et al. | 715/501.1 |
| 2003/0117663 A1 * | 6/2003 | Oonuma | 358/402 |
| 2005/0015457 A1 * | 1/2005 | Warasawa | 709/207 |
| 2005/0086525 A1 * | 4/2005 | Cirulli et al. | 713/201 |
| 2008/0147679 A1 * | 6/2008 | Kelley et al. | 707/10 |
| 2009/0076838 A1 * | 3/2009 | Cirulli et al. | 705/1 |
| 2009/0097059 A1 * | 4/2009 | Iijima | 358/1.15 |
| 2009/0222763 A1 * | 9/2009 | Dukhon et al. | 715/808 |
| 2011/0153458 A1 * | 6/2011 | Wong et al. | 705/26.82 |
| 2012/0023416 A1 * | 1/2012 | Khoo | 715/752 |
| 2012/0123906 A1 * | 5/2012 | Cirulli et al. | 705/26.82 |
| 2012/0209746 A1 * | 8/2012 | Eisner et al. | 705/26.82 |
| 2013/0185659 A1 * | 7/2013 | Dawson et al. | 715/758 |
| 2013/0339922 A1 * | 12/2013 | Sproule | 717/103 |

* cited by examiner

*Primary Examiner* — Ted Barnes
(74) *Attorney, Agent, or Firm* — Buchanan Ingersoll & Rooney PC

(57) ABSTRACT

A method for obtaining one or more signatures on a document is disclosed, which includes: inputting information of a requestor and one or more approvers into an image forming apparatus and requesting signature approval on one or more documents; generating an e-mail from the image forming apparatus to the one or more approvers; forwarding the generated e-mail to the one or more approvers, wherein the one or more approvers can approve or reject the request for the signature approval from the requestor, forwarding the approval or rejection from each of the one or more approvers to the remote server upon selection of an approval or a rejection icon, and processing the approval or rejection of each of the one or more approvers on the remote server and generating a notification on the remote server, which is forwarded to the image forming apparatus.

20 Claims, 21 Drawing Sheets

FIG. 3C

Read To Copy      Copies : 1

| Basic | Original setting | Quality / Density | Approval Request |

Requestor : Taro suzuki ▽

Approver #1 : Takashi Sato ▽   Mr. ▽   suzuki@abc.xxx.us   QA Gr. Leader

Approver #2 : John Smith ▽   Mr. ▽   Sato@abc.xxx.us   Manager

Approver #3 :   Mr. ▽   Smith@abc.xxx.us   Div. Manager

Due date : 02/22/2013

Notification : ⦿(1) Contact Requestor whenever receiving approval from each Approver.
○(2) Contact Requestor after receiving all of approval from each Approver.

Comment to Approver :

Job List    Check Job    Status    ←   →   Delete   Job Details 312, 314, 320, 322, 326, 310

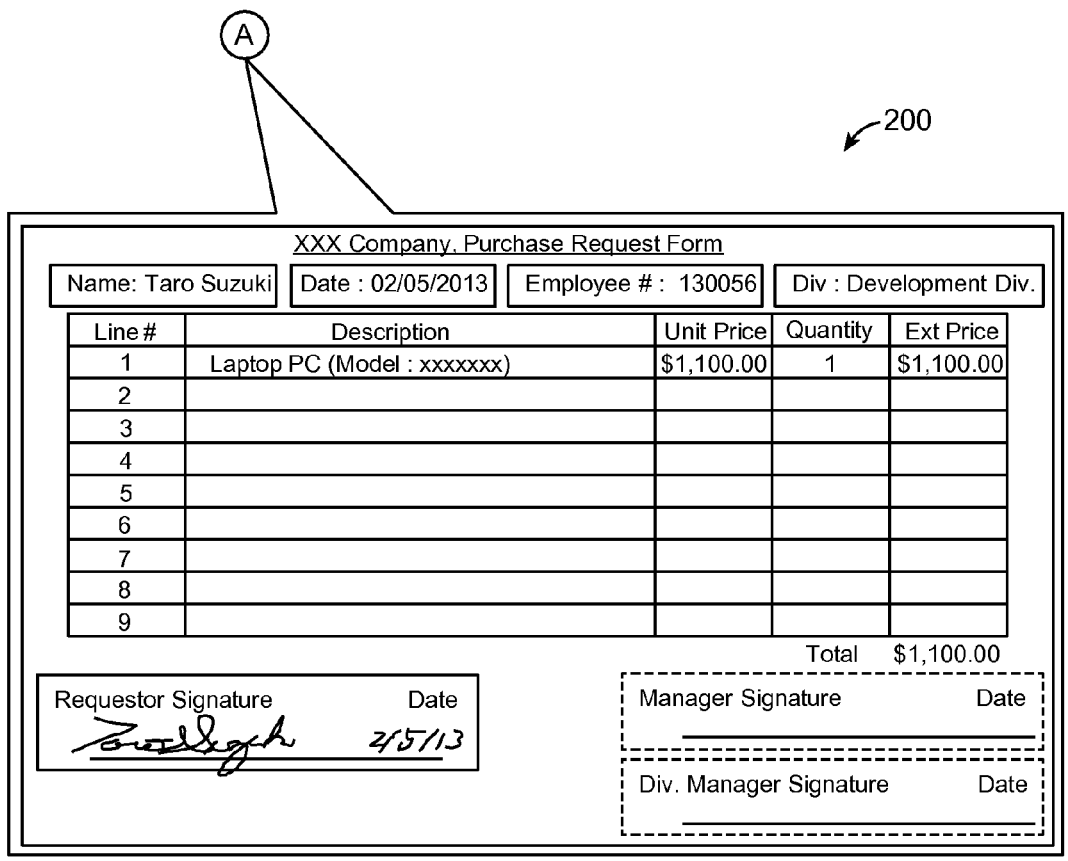
FIG. 4 (Cont. 1)

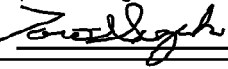
FIG. 4 (Cont. 2)

FIG. 4 (Cont. 3)

Email to Mr. Smith (Div. Manager) from MFP

| From: | MFP#1 [mfp_1@abc.xxx.us] |
| --- | --- |
| To: | Mr. Smith[smith@abc.xxx.us] |
| Cc: | |
| Subject: | Approval Request #020520131040am |

✉ Message | 📄 Documentation_020520131040am.pdf (1MB) — 200

Dear Mr. Smith,

Here is approval request from Mr. Suzuki.

Mr. Suzuki submitted following document on Feb.5, 2013, and he is asking you to give your approval for this. If you agree to give approval, please press "APPROVE" button below, then the system will give your signature data to Mr. Suziki. If you don't, please press "DISMISS" button below. Then the system will send the notice that you don't agree on it.

Due date : 2/22/2013

Comment from Mr.Suzuki :

XXX Company, Purchase Request Form

Name: Taro Suzuki | Date : 02/05/2013 | Employee # : 130056 | Div : Development Div.

| Line# | Description | Unit Price | Quantity | Ext Price |
| --- | --- | --- | --- | --- |
| 1 | Laptop PC (Model : xxxxxxx) | $1,100.00 | 1 | $1,100.00 |
| 2 | | | | |
| 3 | | | | |
| 4 | | | | |
| 5 | | | | |
| 6 | | | | |
| 7 | | | | |
| 8 | | | | |
| 9 | | | | |

Total $1,100.00

Requestor Signature    Date

Manager Signature    Date

Div. Manager Signature    Date

[APPROVE] —520     [DISMISS] —530

Thank you,
MFP Auto Signature Service

Web page link with Mr. Smith's password. These buttons are linked to Web page on Server#1.

FIG. 5 (Cont.)

Example of Notification info : File name "#020520131040am.txt"

| | |
|---|---|
| Approval Request ID : | #020520131040am |
| Request Form (File) Name : | Documentation_020520131040am.pdf |
| Request Date : | 02/05/2013 |
| Request Due Date : | 02/22/2013 |
| Notification to Requestor : | (1) Contact Requestor whenever receiving approval from each Approver. |
| MFP Name : | MFP#1 |
| MFP email address | mfp_1@abc.xxx.us |
| Requestor : | Taro Suzuki |
| Requestor Prefix : | Mr. |
| Requestor email address : | suzuki@abc.xxx.us |
| Comment from Requestor to Approver : | |
| Approver #1 : | Takashi Sato |
| Approver #1 Prefix : | Mr. |
| Approver #1 email address : | sato@abc.xxx.us |
| Approver #2 : | John Smith |
| Approver #2 Prefix : | Mr. |
| Approver #2 email address : | smith@abc.xxx.us |
| Approver #3 : | |
| Approver #3 Prefix : | |
| Approver #3 email address : | |

Hi TAKASHI SATO, welcome back  [Log out]

Approval Request History

Do you DISMISS Request ID #020520131040am?

[Yes]  [Cancel]

| Request Date | Approval Request ID | Result | |
|---|---|---|---|
| 02/05/2013 | #020... | | |
| 12/15/2012 | #121... | Dismissed | View |
| 11/22/2012 | #112... | Approved | View |
| 07/06/2012 | #070... | Approved | View |

Hi TAKASHI SATO, welcome back  [Log out]

Approval Request History

| Request Date | Approval Request ID | Response Date | Result | |
|---|---|---|---|---|
| 02/05/2013 | #020520131040am | 02/11/2013 | (Dismissed) | View |
| 12/15/2012 | #121520120505pm | 12/21/2012 | Dismissed | View |
| 11/22/2012 | #112220120130pm | 11/22/2012 | Approved | View |
| 07/06/2012 | #070620120240pm | 07/07/2012 | Approved | View |

Approval Request History (top screen)

http://www.xxx.com

File  Edit  View  Favorites  Tools  Help

Hi TAKASHI SATO, welcome back    [Log out]

Approval Request History

| Request Date | Appr... | | Result |
|---|---|---|---|
| 02/05/2013 | #02C... | | Dismissed |
| 12/15/2012 | #121... | | Dismissed  View |
| 11/22/2012 | #112... | | Approved  View |
| 07/06/2012 | #07C... | | Approved  View |

Dialog 740:
You have already DISMISSED Request ID #020520131040am.

[OK]

--- http://www.xxx.com

File  Edit  View  Favorites  Tools  Help

Hi TAKASHI SATO, welcome back    [Log out]

Approval Request History

| Request Date | Approval Request ID | Response Date | Result | |
|---|---|---|---|---|
| 02/05/2013 | #020520131040am | 02/11/2013 | Dismissed | View |
| 12/15/2012 | #121520120505pm | 12/21/2012 | Dismissed | View |
| 11/22/2012 | #112220120130pm | 11/22/2012 | Approved | View |
| 07/06/2012 | #070620120240pm | 07/07/2012 | Approved | View |

FIG. 7-4

SECURE APPROVAL PROCESS

FIELD OF THE INVENTION

This invention relates to a method and system for obtaining signature approval on a document.

BACKGROUND

In recent years, the electric document is getting increased, and the paper document is decreasing, however, contracts, expense request or reports, and other document still require a signature that is processed by using a print medium or sheet.

SUMMARY OF THE INVENTION

In consideration of the above issues, it would be desirable to have a system and method, which makes it possible for an individual (or "requestor") to obtain signature approval in via a secure process from one or more remote individuals or supervisors (or "approvers") on a contract or an expense report or request, even though the one or more approvers are at different location or locale than the requestor.

In accordance with an exemplary embodiment, a method for obtaining one or more signatures on a document is disclosed, comprising: inputting information of a requestor and one or more approvers into an image forming apparatus and requesting signature approval on one or more documents; generating an e-mail from the image forming apparatus to the one or more approvers, wherein the e-mail requests the signature approval of the one or more approvers on the one or more documents; forwarding the generated e-mail to the one or more approvers, wherein the one or more approvers can approve or reject the request for the signature approval from the requestor, the e-mail having approval and rejection icons, which are linked to a remote server; sending the one or more documents to the remote server, wherein the remote server hosts the approval and rejection of the one or more documents; forwarding the approval or rejection from each of the one or more approvers to the remote server upon selection of an approval or a rejection icon, processing the approval or rejection of each of the one or more approvers on the remote server and generating a notification on the remote server, which is forwarded to the image forming apparatus in accordance with a notification setting received from the image forming apparatus; and generating a print out of the one or more documents upon receipt of the notification from the remote server in accordance with the notification setting.

In accordance with an exemplary embodiment, a computer program product comprising a non-transitory computer readable medium having a computer readable code embodied therein for obtaining one or more signatures on a document is disclosed, the computer readable program code configured to execute a process, which includes the steps of: inputting information of a requestor and one or more approvers into an image forming apparatus and requesting signature approval on one or more documents; generating an e-mail from the image forming apparatus to the one or more approvers, wherein the e-mail requests the signature approval of the one or more approvers on the one or more documents; forwarding the generated e-mail to the one or more approvers, wherein the one or more approvers can approve or reject the request for the signature approval from the requestor, the e-mail having approval and rejection icons, which are linked to a remote server; sending the one or more documents to the remote server, wherein the remote server hosts the approval and rejection of the one or more documents; forwarding the approval or rejection from each of the one or more approvers to the remote server upon selection of an approval or a rejection icon, processing the approval or rejection of each of the one or more approvers on the remote server and generating a notification on the remote server, which is forwarded to the image forming apparatus in accordance with a notification setting received from the image forming apparatus; and generating a print out of the one or more documents upon receipt of the notification from the remote server in accordance with the notification setting.

In accordance with an exemplary embodiment, an image forming system is disclosed comprising: a remote server; and an image forming apparatus connected to the remote server through a network connection, and wherein the remote server and the image forming apparatus perform the following steps: inputting information of a requestor and one or more approvers into the image forming apparatus and requesting signature approval on one or more documents; generating an e-mail from the image forming apparatus to the one or more approvers, wherein the e-mail requests the signature approval of the one or more approvers on the one or more documents; forwarding the generated e-mail to the one or more approvers, wherein the one or more approvers can approve or reject the request for the signature approval from the requestor, the e-mail having approval and rejection icons, which are linked to a remote server; sending the one or more documents to the remote server, wherein the remote server hosts the approval and rejection of the one or more documents; forwarding the approval or rejection from each of the one or more approvers to the remote server upon selection of an approval or a rejection icon, processing the approval or rejection of each of the one or more approvers on the remote server and generating a notification on the remote server, which is forwarded to the image forming apparatus in accordance with a notification setting received from the image forming apparatus; and generating a print out of the one or more documents upon receipt of the notification from the remote server in accordance with the notification setting.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3A-3D are illustrations of user interface screens on an image forming apparatus in accordance with an exemplary embodiment.

FIG. 6 is an illustration of exemplary notification information as received by a remote server from the image forming apparatus in accordance with an exemplary embodiment.

FIG. 7 is an illustration of approval screens in accordance with an exemplary embodiment.

DESCRIPTION OF THE PREFERRED EMBODIMENTS

Figure 1:
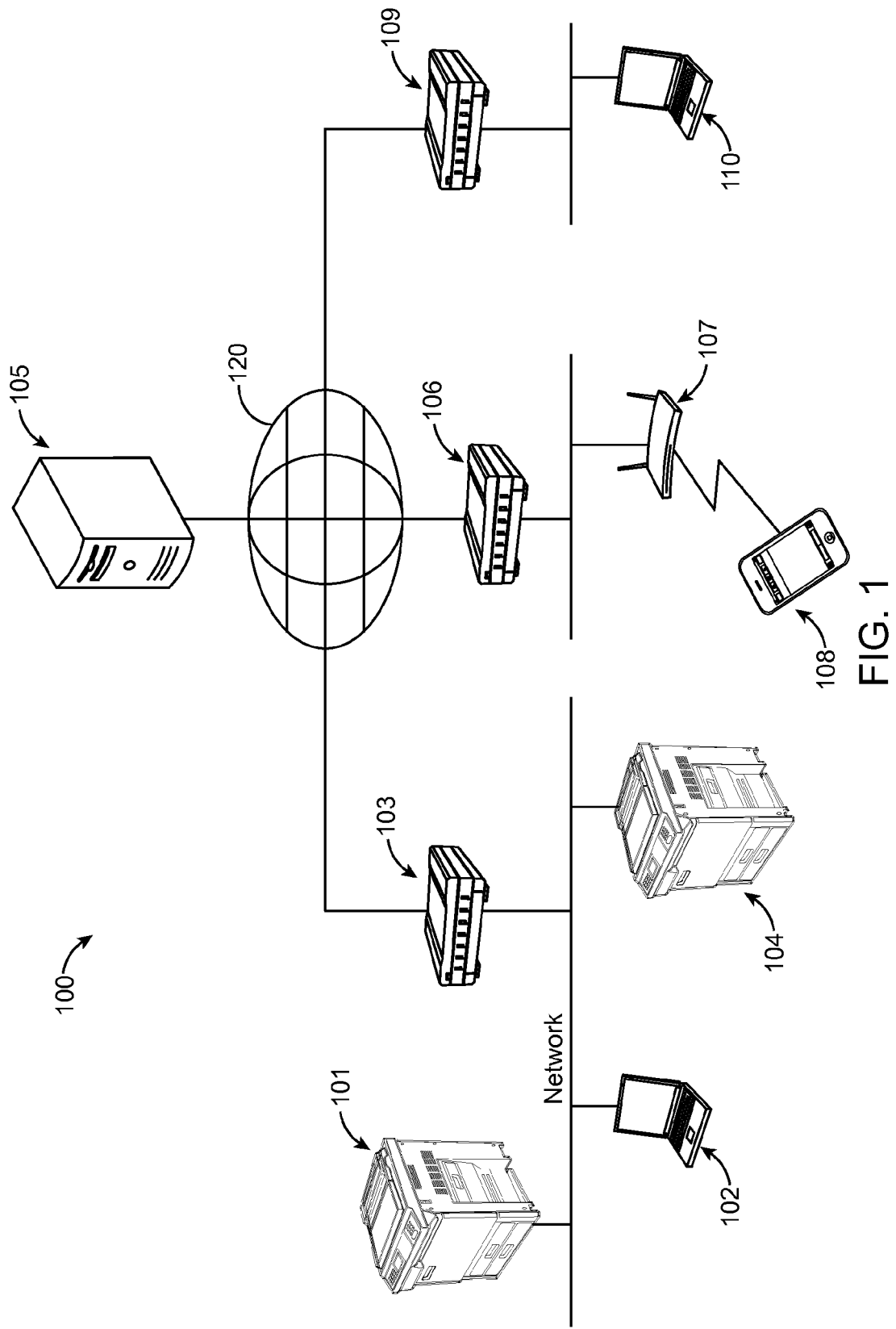
FIG. 1 is an illustration of an image forming system for a secure approval process having one or more image forming apparatuses in accordance with an exemplary embodiment.

FIG. 1 is an illustration of a system 100 for obtaining signature approval of one or more documents 200 (FIG. 2) in accordance with an exemplary embodiment. As shown in FIG. 1, the system 100 includes an image forming apparatus 101, one or more clients or client devices, 102, 104, 108, 110, one or more routers or networking devices 103, 106, 107, 109, and a remote server 105. As shown in FIG. 1, the one or more clients 102, 104, 108, 110, the image forming apparatus 101, the one or more routers or networking devices 103, 106, 107, 109, and the remote server 105 can be connected via an Internet or network connection 120, such as a LAN (Local Area Network) or WAN (Wide Area Network).

In accordance with an exemplary embodiment, each of the one or more client devices 102, 104, 108, 110 include a processor or central processing unit (CPU), one or more memories for storing software programs and data (such as files to be printed). The processor or CPU carries out the instructions of a computer program, which operates and/or controls at least a portion of the functionality of the client devices 102, 104, 108, 110. Each of the client devices 102, 104, 108, 110, also includes an operating system (OS), which manages the computer hardware and provides common services for efficient execution of various software programs. For example, the software programs can include application software and printer driver software. The printer driver software controls the image forming apparatus 101 connected with the client devices 102, 104, 108, 110 in which the printer driver software is installed. In certain embodiments, the printer driver software produces a print job and/or document based on an image and/or document data. In addition, the printer driver software can control transmission of the print job from the client device 102, 104, 108, 110 to the image forming apparatus 101.

Each of the client devices 102, 104, 108, 110 can also include a display in the form of a graphical user interface. In accordance with an exemplary embodiment, the printer driver software generates a printer driver user interface or graphical user interface in which the user of the client device 102, 104, 108, 110 can provide instructions to the image forming apparatus 101. For example, each of the client devices 102, 104, 108, 110 can be configured to receive e-mails from the image forming apparatus 101 via the network 120 and/or wireless and cellular devices 107. In accordance with an exemplary embodiment, users of the client device 102, 104, 108, 110 can receive e-mails and approve one or more documents as requested in accordance with an exemplary embodiment as disclosed herein. Examples of client devices 102, 104, 108, 110 include and are not limited to personal computers, routers, image forming apparatuses, and/or personal digital assistants (PDAs).

Examples of an image forming apparatus 101 consistent with exemplary embodiments include, but are not limited to, a laser beam printer (LBP), a multifunction peripherals (MFP), a multifunction laser beam printer including copy function, an ink jet printer (IJP), a thermal printer (e.g., a dye sublimation printer) and a silver halide printer. For example, the image forming apparatus can be a color printer or a black and white (B/W) printer.

Examples of the network 120 consistent with embodiments include, but are not limited to, the Internet, an intranet, a local area network (LAN) and a wide area network (WAN). Alternatively, the Internet or network connection 120, which connects the one or more client devices 102, 104, 108, 110 and the image forming apparatus 101 can be a wire (or cable) and/or wireless technology including but not limited to radio frequency (RF) and/or infrared (IR) transmission.

Figure 2:
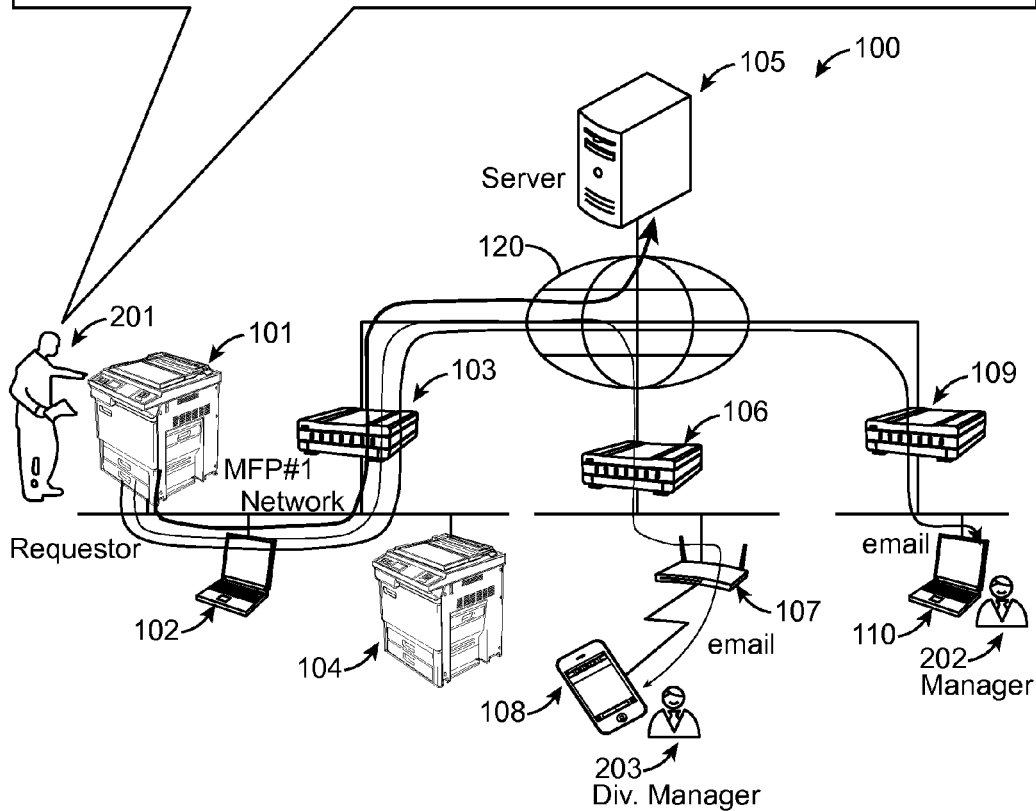
FIG. 2 is an illustration of a document and the system for a secure approval process as shown in FIG. 1 in accordance with an exemplary embodiment.
Figure 3A:
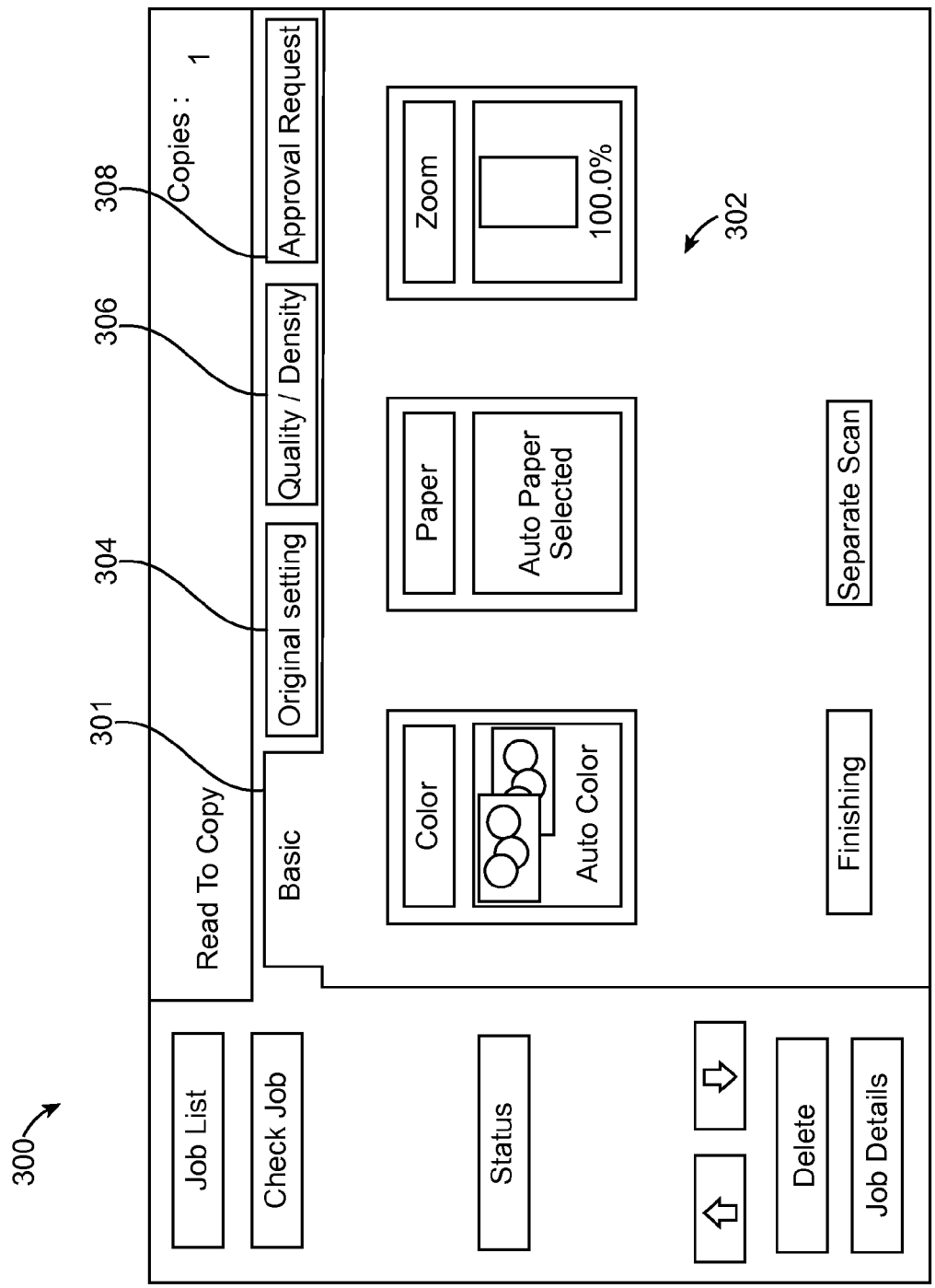
Figure 3B:
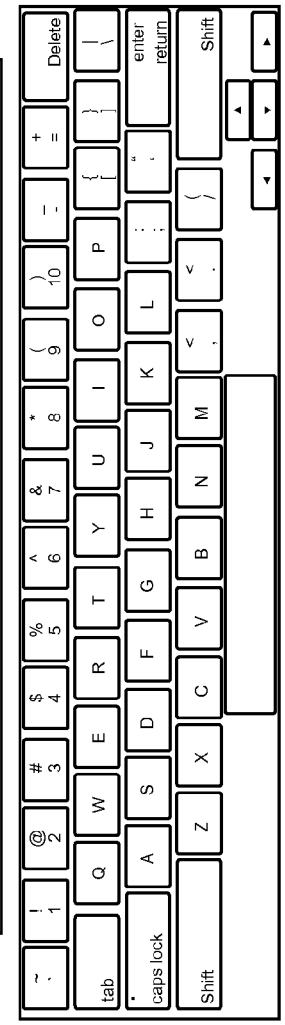
Figure 3D:
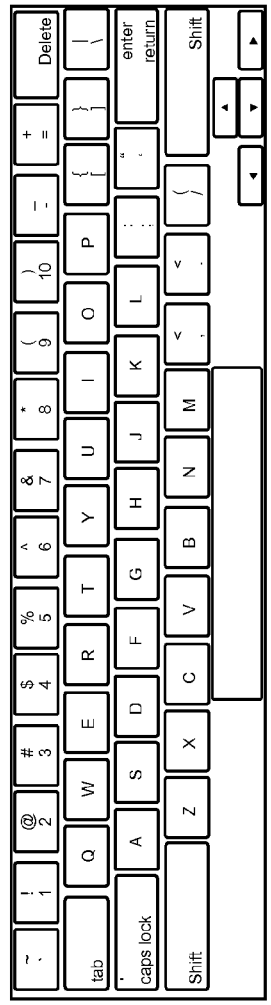

FIG. 2 is an illustration of a document 200 and the system 100 for a secure approval process as shown in FIG. 1 in accordance with an exemplary embodiment. As shown in FIG. 2, in accordance with an exemplary embodiment, a requestor 201 can obtain one or more signatures on a document using an image forming apparatus 101. In accordance with an exemplary embodiment, the requestor 201 inputs the information of the requestor 201 and one or more approvers 202, 203 (e.g., manager and divisional manager) into the image forming apparatus 101 requesting signature approval of one or more documents 200. The image forming apparatus generates an e-mail 500, 510 (FIG. 5) for each of the one or more approvers 202, 230.

In accordance with an exemplary embodiment, the image forming apparatus 101 forwards the e-mails 500, 510 to the approvers 202, 203 requesting signature approval of the one or more documents 200. Upon receipt of the e-mail 500, 510, the one or more approvers 202, 203 can approve or reject the request of the requestor 201 by replying to the e-mail 500, 510. In accordance with an exemplary embodiment, the one or more approvers 202, 203 can approve or reject the request by clicking on the "Approve" or "Dismiss" icons provided on the e-mails. The approvers 202, 203 approval or rejection (e.g., dismissal) of the requests are then forwarded to the image forming apparatus 101. A print out of the document 200 upon receipt of the approval or rejections from the one or more approvers is generated by the image forming apparatus 101, and for those approvers 202, 203, which have approved the request, a copy of the signature is affixed to the document 200. In accordance with an exemplary embodiment, the signatures of the approvers 202, 203 are hosted on a remote server 105 for security purposes.

In accordance with an exemplary embodiment, the one or more documents 200 can be scanned on the image forming apparatus 101, which generates the e-mail, which is forwarded to the one or more approvers 202, 203. Alternatively, in accordance with an exemplary embodiment, the one or more documents 200 can be generated for approval on a client device and forwarded to from the client device 102, 104, 108, 110 to the image forming device 101 for generation of the e-mail based on the one or more documents 200 received from the client device 102, 104, 108, 110.

FIGS. 3A-3D are illustrations of user interface screens 300 on an image forming apparatus 101 in accordance with an exemplary embodiment, which can be used to generate the e-mails 500, 510 to be sent by the image forming apparatus to the one or more approvers 202, 203. As shown in FIG. 3, the image forming apparatus 101 can includes a graphical user interface or touch screen 300, which can include icons for functions such as (1) Basic 301, which includes features such as color, paper and zoom 302, (2) Digital Setting 304, (3) Quality/Density 306, and (4) Approval Request 308. The icons 302, 304, 306, 308 can be a click through windows and/or pull down windows.

Upon activation of the approval request icon 308, the approval request screen 310 can request information identifying the requestor 312, and the one or more approvers 314. In accordance with an exemplary embodiment, the requestor 312 and the one or more approvers 314 can include information from an employee database including the names of the requestor, one or more approvers, prefix (i.e., Mr. or Ms.) and job title. The request screen 310 can also include a due date 320, notification icons 322, and a key pad 326 for typing comments to the one or more approvers. The notification icons 322 can include notification 1, "Contact Requestor whenever receiving approval from each approver" or notification 2, "Contact Requestor after receiving all of approval from each approver".

Figure 4:
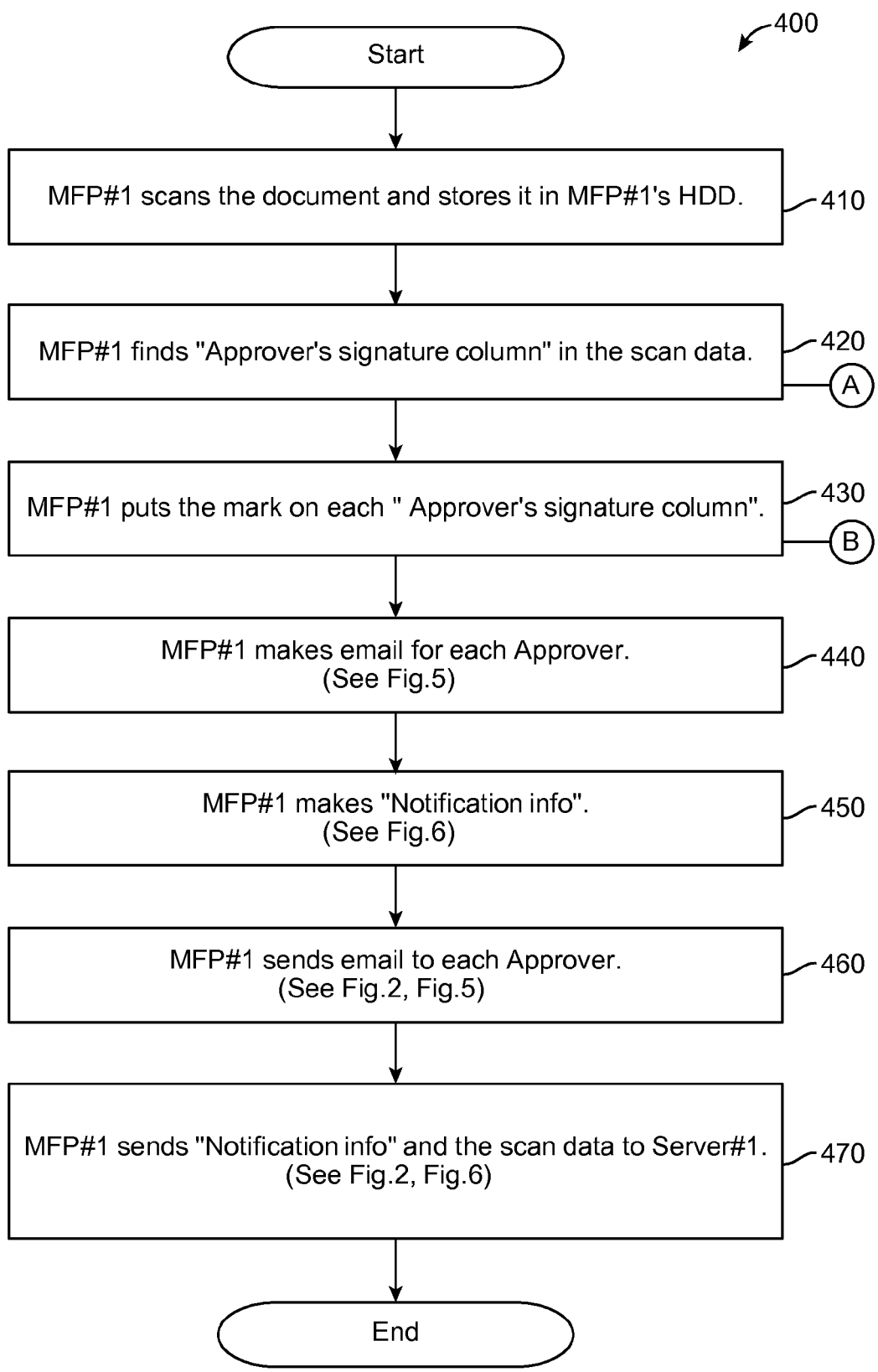
FIG. 4 is an illustration of a flow chart for a secure approval process in accordance with an exemplary embodiment.

FIG. 4 is an illustration of a flow chart 400 for a secure approval process in accordance with an exemplary embodiment. As shown in FIG. 4, in step 410, the one or more documents 200 can input into the image forming apparatus via scanning the document on the image forming apparatus, or alternatively, received from a client device. The document is then stored within the image forming apparatus within a memory portion of the apparatus, for example, the hard disk drive. In step 420, the image forming apparatus 101 retrieves "approver signature column" from memory based on the information input by the requestor 201. In step 430, the image forming apparatus inserts the "approver signature column" on each of the one or more documents. In step 440, the image forming apparatus generates an e-mail for each approver. In step 450, the image forming apparatus generates notification information 600 (FIG. 6) for each request based on the input information of the requestor. In step 460, the image forming apparatus 201 sends e-mails to each of the one or more approvers. In step 470, the image forming apparatus sends the "notification information" and the scan data to a remote server 105 pending approval from the one or more approvers 202, 203. In accordance with an exemplary embodiment, the remote server 105 hosts the approval signatures of the one or more approvers 202, 203 outside of the image forming apparatus 101. In addition, the e-mail generated by the image forming apparatus 101 can include a preinstalled password, such that the one or more approvers 202, 203 are not required to enter a password for approval of the request.

Figure 5:
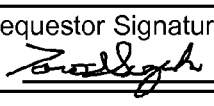
FIG. 5 is an illustration of e-mails received by one or more parties having authorization approval in accordance with an exemplary embodiment.

FIG. 5 is an illustration of e-mails 500, 510 received by one or more approvers having authorization approval in accordance with an exemplary embodiment. As shown in FIG. 5, the e-mails generated by the image forming apparatus 101 can include an attached copy of the one or more documents 200 for approval and an approval icon 520 and a dismiss or reject icon 530. In accordance with an exemplary embodiment, the approval ("Approve") icon 520 and the dismissal or reject ("Dismiss") icon 530 include a web link to a password hosted on the remote server 105 for the electronic signature of each of the one or more approvers 202, 203.

FIG. 6 is an illustration of exemplary notification information 600 as received by the remote server 105 from the image forming apparatus 201 in accordance with an exemplary embodiment. In accordance with an exemplary embodiment, notification information 600 as shown in FIG. 6 is generated in the image forming apparatus 201 (step 450 of FIG. 4) in connection with e-mails 500, 510, and is forwarded to the remote server 105. Once the remote server 105 receives the approval or dismissal of the approval request by one or more of the approvers 202, 203, the remote server 105 generates a corresponding response having the same notification information 600 as received from the image forming apparatus 101. The remote server 105 updates the notification information 600 received from the image forming apparatus 101, for example, by including the signature date of the one or more approvers 202, 203, and forwards the notification information 600 back to the image forming apparatus 101.

In accordance with exemplary embodiment, the information contained within the notification request 600 can be used in the remote server 105 to synchronize the approval or rejections from the one or more approves 202, 203, and/or for approval requests received from the image forming apparatus 101. In accordance with an exemplary embodiment, the notification request 600 can include, for example, Approval Request ID, Request Form (File) Name, Request Date, Request Due Date, Notification to Requestor, MFP Name, MFP e-mail address, Requestor, Requestor e-mail address, Comment from Requestor to Approver, Approver 1, Approver 1 prefix, Approver 1 e-mail address, Approver 2, Approver 2 prefix, Approver 2 e-mail address, Approver 3, Approver 3 prefix, and Approver 3 e-mail address.

FIG. 7 is an illustration of approval screens 700 in accordance with an exemplary embodiment. Upon receipt of the e-mail 500, 510 as shown in FIG. 5, the one or more approvers can either approve or dismiss the requestor's request. Upon selection of either the approval or dismissal icon 520, 530, a request for confirmation can be made in the form of a confirmation icon 710, 720, which request confirmation of the approval or dismissal of the request, respectively. Alternatively, if the one or more approvers has already approved or dismissed the request, an icon indicating that the approver has already approved 730 or dismissed 740 the request can be presented to the one or more approvers 202, 203.

Figures 1, 8:
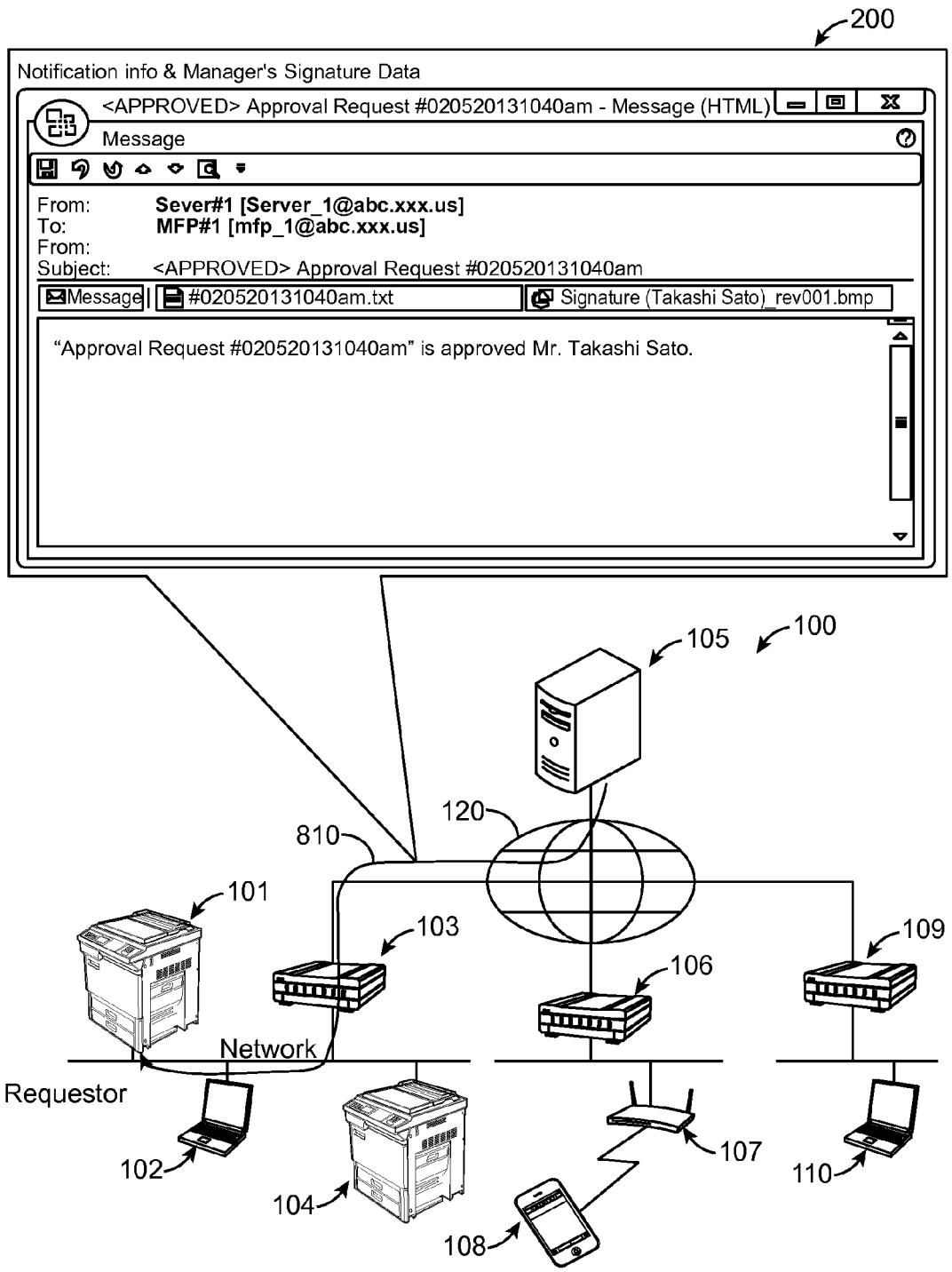
FIG. 8 is an illustration of the system of FIG. 1 in accordance with an exemplary embodiment, wherein the request has been approved.
Figures 2, 8:
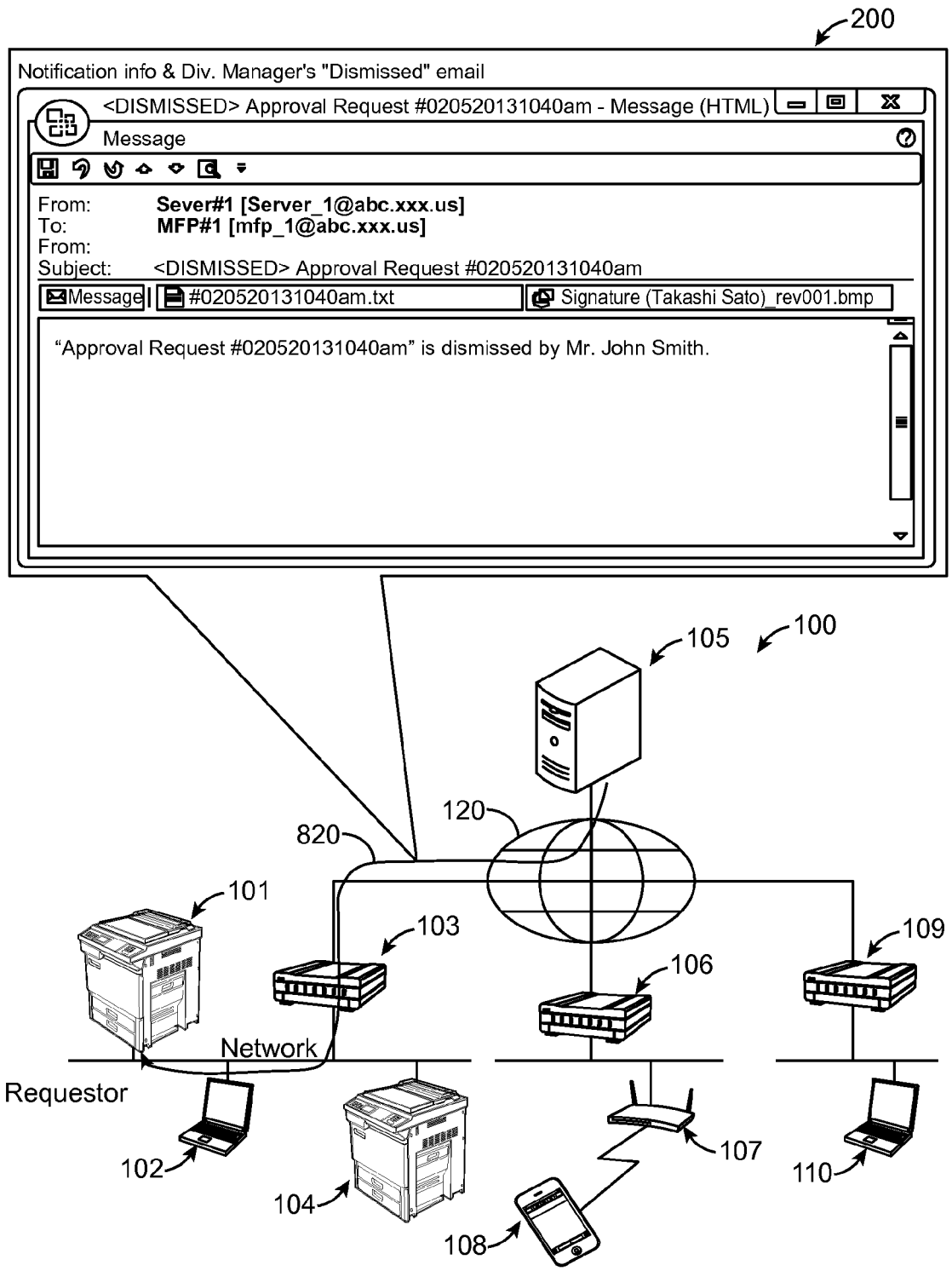

FIG. 8 is an illustration of the system 100 of FIG. 1 in accordance with an exemplary embodiment, wherein the request has been approved. As shown in FIG. 8-1, upon approval of the request for signature, the signature of the approver 202, 203 is attached to the one or more documents 200, which are currently hosted on the remote server 105. A request 810 with the one or more documents 200 and the approved signatures are forwarded from the remote server 105 to the image forming apparatus 101. Alternatively, as shown in FIG. 8-2, if the request has been dismissed, a similar response 820 can be sent from the remote server 105 to the image forming apparatus 201.

Figure 9:
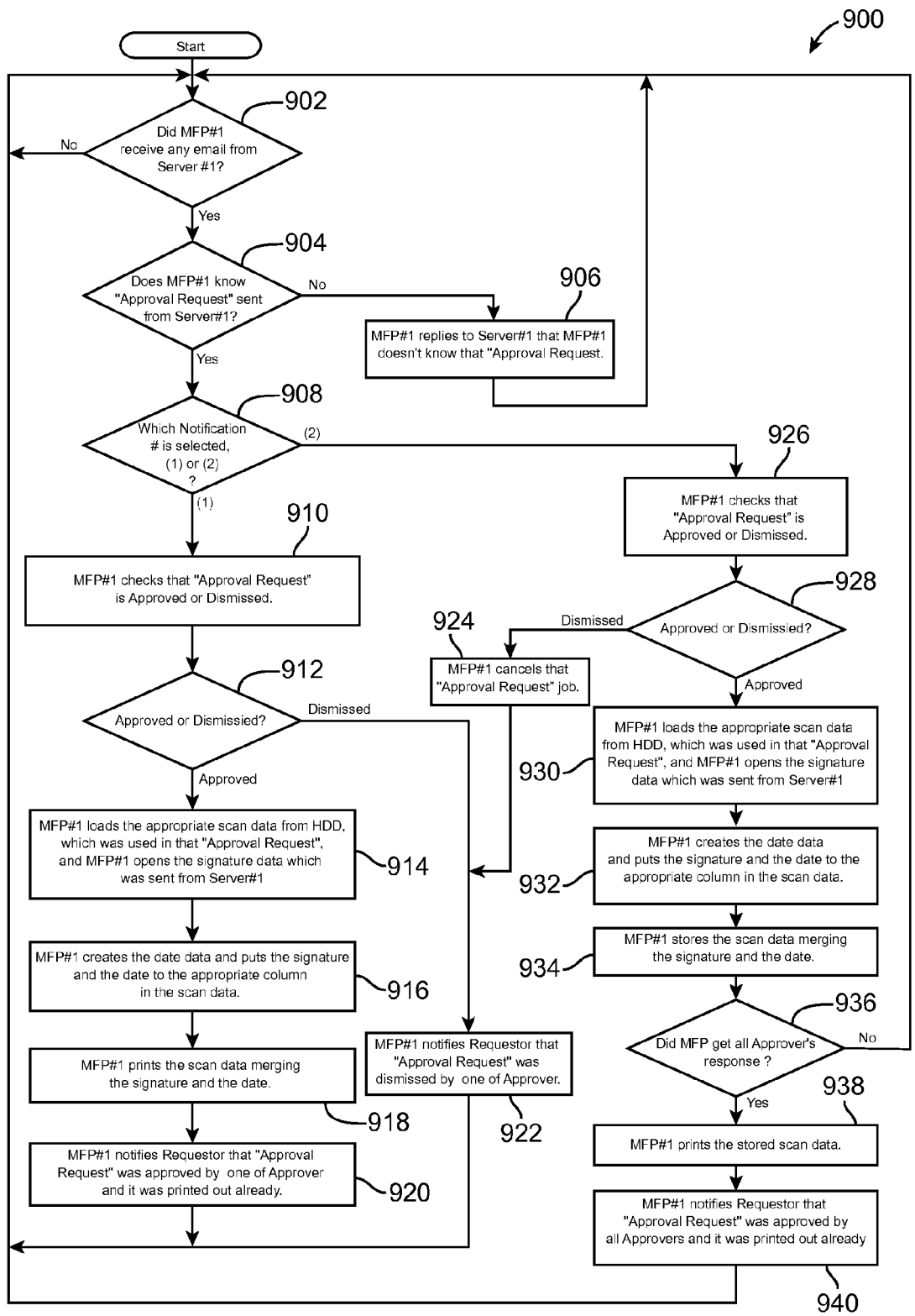
FIG. 9 is a flow chart of the process for approving and/or dismissing a request for approval of a document in accordance with an exemplary embodiment.

FIG. 9 is a flow chart 900 of the process for approving and/or dismissing a request for approval of a document in accordance with an exemplary embodiment. In step 902, the image forming apparatus 201 checks for e-mails received from the remote server 105. If no, the process starts over and repeats step 902 until an e-mail request is received. If an e-mail request has been received, in step 904, the image forming apparatus check to see if any "Approval Requests" have been sent to the remote server 105. If no requests have been sent to remote server 105, in step 906, the image forming apparatus 101 responds to the remote server 105 and indicates that no requests for approval have been sent and the process returns to step 902.

If one or more requests have been sent for approval from the image forming apparatus 101, the image forming apparatus 101 determines which notification was requested by the requestor 201. If notification 1 was selected, "Contact Requestor whenever receiving approval from each approver" the process continues to step 910, or notification 2, "Contact Requestor after receiving all of approval from each approver", the process continues to step 926. In step 912, the image forming apparatus 101 determines if the one or more approvers "approved" or "dismissed" the request. If the request was approved, the process continues to step 914, the image forming apparatus 101 loads the appropriate scan data from memory, which was used in the "approval request" and the image forming apparatus 101 opens the signature data received from the remote server 105. In step 916, the image forming apparatus 101 creates the date data and puts the signature and the date in the appropriate column in the scan data. In step 918, the image forming apparatus 101 prints the scan data merging the signature and the date. In step 920, the image forming apparatus 101 notifies the requestor that "approval request" was approved by one of the approvers 202, 203, and that a printout of the one or more documents has been printed by the image forming apparatus 101.

If the request is dismissed, in step 922, the image forming apparatus 101 notifies the requestor that "approval request" was dismissed or rejected by one of the approvers 202, 203.

If notification 2 is selected, in step 926, the image forming apparatus 101 determines if the approval request has been approved or dismissed. If dismissed by one or more of the approvers, in step 924, the image forming apparatus 101 cancels the approval request job and the process continues to step 922, wherein the image forming apparatus 101 notifies requestor that "approval request" was dismissed or rejected by one of the approvers 202, 203. If the approval request is approved, in step 930, the process continues to step 932, wherein the image forming apparatus 101 loads the appropriate scan data from memory, which was used in the "approval request" and the image forming apparatus 101 opens the signature data received from the remote server 105. In step 934, the image forming apparatus 101 creates the date data and puts the signature and the date to the appropriate column in the scan data. In step 936, the image forming apparatus 101 determines if the image forming apparatus 101 received all of the approvers 202, 203 responses. If not all the responses have been received, the process continues to step 902, wherein the process starts over. If responses from all of the approvers have been received, the process continues to step 938, wherein the image forming apparatus 101 prints the scan data merging the signature and the date. In step 940, the image forming apparatus 101 notifies the requestor that "approval request" was approved by all of the approvers 202, 203, and that a printout with signature approval has been printed by the image forming apparatus 101.

Figure 10:
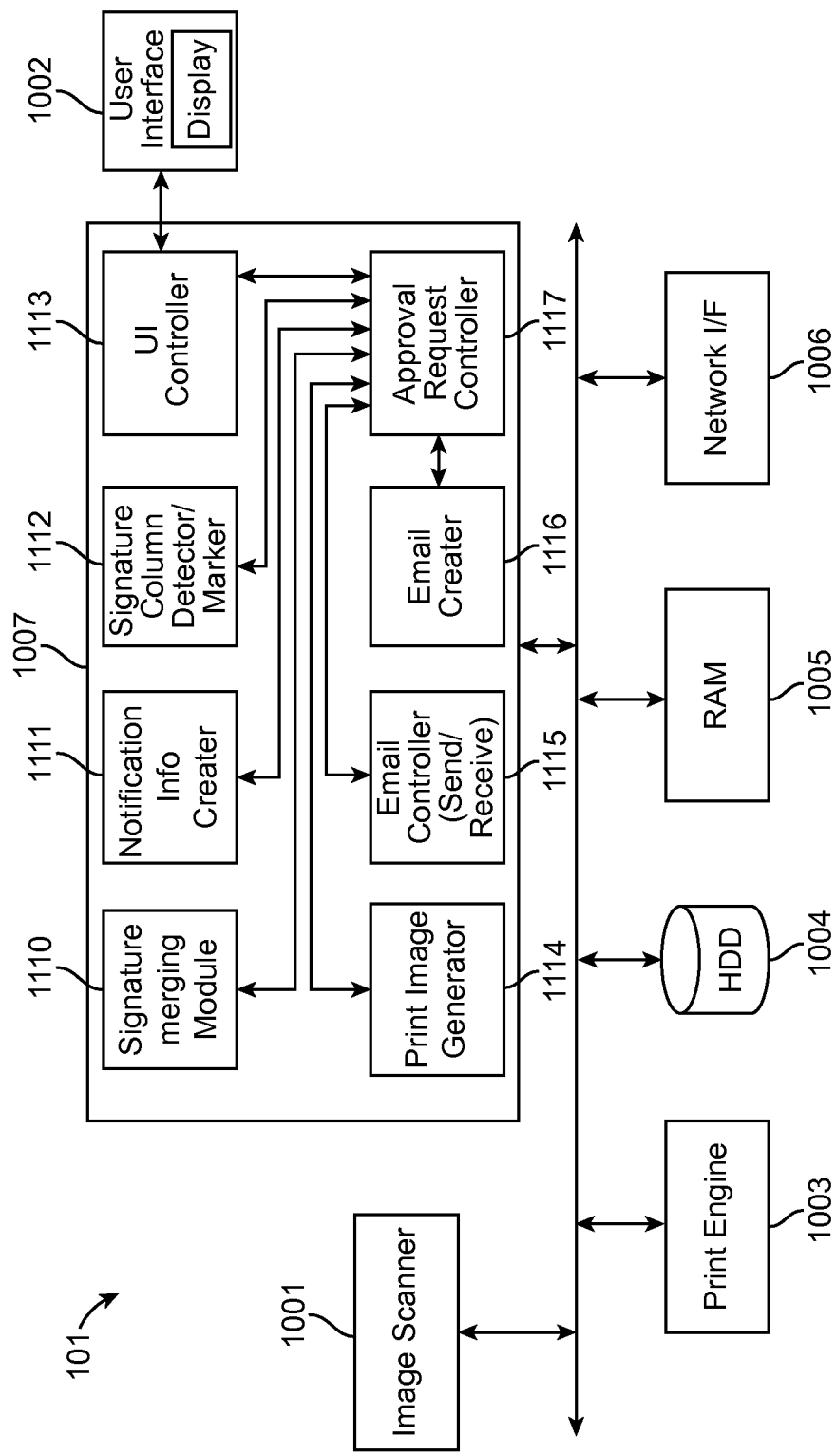
FIG. 10 is an illustration of a block diagram of an image forming apparatus in accordance with an exemplary embodiment.

FIG. 10 is a block diagram of portions of an image forming apparatus 101 in accordance with an exemplary embodiment. As shown in FIG. 10, the image forming apparatus 101 includes an image scanner (which can include an automatic document feeder (ADF)) 1001, an operation panel or display 1002, a print engine 1003, a hard disk drive (HDD) 1004, RAM (random access memory) 1005, and a network I/F (interface) section 1006, and a processor portion 1007. In accordance with an embodiment, each part or portion of the image forming apparatus 101 are connected, for example by bus or bus connection.

In accordance with an exemplary embodiment, the image forming apparatus 1001 includes an image scanner 1001 for making the electric image data and a print engine 1003 for printing the approved application form. The processor portion 1007 can include an Approval Request Controller 1117, which can be configured to control the method and processes as disclosed herein. A UI (user interface) controller 1113 is configured to control the User Interface and display 1002. In accordance with an exemplary embodiment, the User Interface and display 1002 obtains information from the requestor 201, one or more approvers 202, 203, and receives an option of how the requestor 201 wishes for print outs of the document 200 upon approval and/or dismissal, and includes a display for showing the different settings for the method and process as disclosed herein. A Signature Column Detector/Marker 1112 is configured to detect and mark signature columns for each of the approver's signature on the document 200. An e-mail creator 1116 is configured to make or generate e-mails to be sent to each approver 202, 203 and the remote server 105. A Notification Information Creator 1111 is configured to make Notification information upon request. An e-mail Controller 1115 (Send/Receive) is configured for sending and receiving e-mails on the image forming apparatus 101. A signature merging module 1110 is configured to merge the scan data and the signature and date data. A print image generator 1114 is configured to generate print data of the scan data to be merged with the signature and date data.

The image forming apparatus 101 includes an image scanner 1001, which images documents (e.g. document for signature approval) which are read or imaged by the scanner and the results input into the processing portion 1007. The image scanner 1001 can include among other components a light source, and CCD (Charge Coupled Device), which images and carries out a photoelectric conversion of the reflected light of the light from the light source to the document, reads the image of the document and outputs the read image to the scan image processor. The image obtained by the image scanner 1001 can contain image data, such as a figure and a photograph, text data, including characters and signs. In accordance with an embodiment, the image scanner 1001 includes an automatic document feeder or ADF, which feeds one or more sheets of a print media to the image scanner 1001 for scanning.

The user interface and display panel 1002 displays the status display of various manual operation buttons or equipment, the operation situation of each function, etc. on the operation panel or display screen according to the instruction of the status signal input from the CPU. In accordance with an embodiment, the user interface and display panel 1002 is a LCD (Liquid Crystal Display) panel. In addition, the user interface and display panel 1002 can be covered with a pressure-sensitive-type (resistance film pressure type) touch panel constituted by arranging a transparent electrode in the shape of a lattice, which detects the XY coordinates of the power point pushed with fingers, a touch pen, etc. with a pressure value, and outputs them to the CPU by making the detected position signal into an operation signal. The display panel 1002 can be provided with various manual operation buttons, such as number buttons and a start button, and outputs the operation signal to the CPU.

For example, if printing in the image forming apparatus 101 is instructed from the display panel 1002, the display panel 1002 outputs operation signals which correspond to the operated key and/or keys to the CPU including the keyboard provided with the various function key, letter keys and/or numerical keypad. The display panel 1002 can also be provided with pointing devices, for example, a mouse and/or a touch panel.

The print engine 1003 can include among other components, a photoconductive drum, a toner, a discharge part, and a feeding part. In accordance with an embodiment, the print engine 1003 includes one or more trays, which houses print media. The print media can be plain paper and other printable media. The print image is conveyed from the print image processor to the print engine 1003 of the image forming apparatus for printing. In accordance with an embodiment, an electrostatic latent image of the print image is provided from the print image processor and formed in the photoconductive drum surface. The print engine 1003 makes a toner adhere to a region including the electrostatic latent image on the surface of a photoconductive drum, and after transferring and fixing a toner to the print media conveyed from a feeding part or tray, which is then discharged to an output tray.

The image forming apparatus 101 also can include a hard disk drive (HDD) or storage device 1004, which stores digital data and/or software programs for recall by the controller. In accordance with an exemplary embodiment, the digital data can include resources, for example, graphics/images, logos, form overlays, fonts, etc. The computer system program and various processing program which are memorized by a storage part (not shown) are read, which develops in RAM 1005, and CPU (not shown) carries out concentrated control of the operation of the image forming apparatus 101 each part according to the developed program.

In the various processing in which execution control is carried out by the CPU, the RAM 1005 becomes a temporary storing region, such as a program read from the storage part, an input or output data, and a parameter.

The network I/F section 1006 provides communications between the processor portion 1007 and the client devices 102, 104, 107, 108, 110 and receives page descriptions (or print data) from the client devices 102, 104, 107, 108, 110 for processing within the image forming apparatus 101. In accordance with an exemplary embodiment, the operation of printer section commences when it receives a page description from the client device 102, 104, 107, 108, 110 via the network I/F 1006 in the form of a print job data stream. The page description may be any kind of page description languages (PDLs), such as PostScript® (PS), Printer Control Language (PCL), Portable Document Format (PDF), XML Paper Specification (XPS).

The processor portion 1007 performs image processing, such as scaling, rotation, and repositioning, gradation processing, frequency processing, to the image data input from the image scanner portion 1001, and outputs the image data to the print engine 1003. In accordance with an embodiment, the processor portion 1007 is configured to execute a sequence of stored instructions (i.e., a computer program). The image forming apparatus 101 also includes an operating system (OS), which acts as an intermediary between the software programs and hardware components within the image forming apparatus 101. The operating system (OS) manages the computer hardware and provides common services for efficient execution of application software.

In accordance with an embodiment, the processor portion 1007, the processor portion 1007 in combination with HDD 1004, RAM 1005, network I/F 1006 processes the data and job information received from the client devices 102, 104, 107, 108, 108, 110, to generate a print image. The processor portion 1007 is programmed to process data and control various other components of the image forming apparatus 101 to carry out the various methods described herein.

In accordance with an exemplary embodiment, a computer program product comprising a non-transitory computer readable medium having a computer readable code embodied therein for obtaining one or more signatures on a document, the computer readable program code configured to execute a process, which includes the steps of: inputting information of a requestor and one or more approvers into an image forming apparatus and requesting signature approval on one or more documents; generating an e-mail from the image forming apparatus to the one or more approvers, wherein the e-mail requests the signature approval of the one or more approvers on the one or more documents; forwarding the generated e-mail to the one or more approvers, wherein the one or more approvers can approve or reject the request for the signature approval from the requestor, the e-mail having approval and rejection icons, which are linked to a remote server; sending the one or more documents to the remote server, wherein the remote server hosts the approval and rejection of the one or more documents; forwarding the approval or rejection from each of the one or more approvers to the remote server upon selection of an approval or a rejection icon, processing the approval or rejection of each of the one or more approvers on the remote server and generating a notification on the remote server, which is forwarded to the image forming apparatus in accordance with a notification setting received from the image forming apparatus; and generating a print out of the one or more documents upon receipt of the notification from the remote server in accordance with the notification setting.

In accordance with an exemplary embodiment, the merging of the approval signatures from the one or more approvers on the one or more document can be performed on the image forming apparatus upon receipt of the notification of approval from the remote server. In accordance with an exemplary embodiment, merging of the approval signatures from the one or more approvers on the one or more documents can be performed on the remote server upon receipt of approval from the one or more approvers, and sending the one or more documents with approval signatures to the image forming apparatus for printing.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for obtaining one or more signatures on a document, comprising:
   inputting information of a requestor and one or more approvers into an image forming apparatus and requesting signature approval on one or more documents;
   generating an e-mail from the image forming apparatus to the one or more approvers, wherein the e-mail requests the signature approval of the one or more approvers on the one or more documents;
   forwarding the generated e-mail to the one or more approvers, wherein the one or more approvers can approve or reject the request for the signature approval from the requestor, the e-mail having approval and rejection icon;
   p1 sending the one or more documents to the remote server, wherein the remote server hosts the approval and rejection of the one or more documents;
   forwarding the approval or rejection of the one or more documents from each of the one or more approvers to the remote server upon selection of an approval icon or the rejection icon on the e-mail;

processing the approval or rejection of each of the one or more approvers on the remote server and generating a notification on the remote server, which is forwarded to the image forming apparatus in accordance with a notification setting received from the image forming apparatus;

canceling the request for the signature approval on the image forming apparatus upon receipt of one or more rejections from the remote server such that the image forming apparatus does not generate a print out of the one or more documents, and notifying the requestor that the request for signature approval has been rejected by one or more approvers; and generating a print out of the one or more documents on the image forming apparatus upon receipt of the notification from the remote server in accordance with the notification setting if the request for signature approval has been approved.

2. The method of claim 1, comprising:

scanning the one or more documents on the image forming apparatus, which generates the e-mail, which is forwarded to the one or more approvers.

3. The method of claim 1, comprising:

generating the one or more documents for approval on a client device; and forwarding the one or more documents from the client device to the image forming device, which generates the e-mail based on the one or more documents received from the client device.

4. The method of claim 1, comprising providing a graphical user interface on the image forming apparatus to input information pertaining to the one or more approvers.

5. The method of claim 4, wherein the information pertaining to the one or more approvers comprises:

inputting an employee database into the image forming apparatus, wherein the employee database includes name, e-mail address and/or job title of the requester and the one or more approvers.

6. The method of claim 1, wherein the image forming apparatus performs the following:

stores the one or more documents in a memory portion of the image forming apparatus;

places a signature box on the one or more documents;

generates the e-mail to the one or more approvers;

sends the e-mail to the one or more approvers; and provides e-mail notification to the requestor upon receipt of the notification from the remote server on the approval or rejection of the request from the one or more approvers.

7. The method of claim 1, comprising:

hosting approval signatures for the one or more approvers on the remote server outside of the image forming apparatus.

8. The method of claim 1, comprising:

merging approval signatures from the one or more approvers on the one or more document on the image forming apparatus upon receipt of the notification of approval from the remote server; and printing the one or more documents with a signature of each of the approvers on the image forming apparatus.

9. The method of claim 1, comprising:

merging approval signatures from the one or more approvers on the one or more documents on the remote server upon receipt of approval from the one or more approvers; and sending the one or more documents with approval signatures to the image forming apparatus for printing.

10. A computer program product comprising a non-transitory computer readable medium having a computer readable code embodied therein for obtaining one or more signatures on a document, the computer readable program code configured to execute a process, which includes the steps of:

inputting information of a requestor and one or more approvers into an image forming apparatus and requesting signature approval on one or more documents;

generating an e-mail from the image forming apparatus to the one or more approvers, wherein the e-mail requests the signature approval of the one or more approvers on the one or more documents;

forwarding the generated e-mail to the one or more approvers, wherein the one or more approvers can approve or reject the request for the signature approval from the requestor, the e-mail having approval and rejection icons;

sending the one or more documents to the remote server, wherein the remote server hosts the approval and rejection of the one or more documents;

forwarding the approval or rejection of the one or more documents from each of the one or more approvers to the remote server upon selection of the approval icon or the rejection icon on the e-mail;

processing the approval or rejection of each of the one or more approvers on the remote server and generating a notification on the remote server, which is forwarded to the image forming apparatus in accordance with a notification setting received from the image forming apparatus;

canceling the request for the signature approval on the image forming apparatus upon receipt of one or more rejections from the remote server such that the image forming apparatus does not generate a print out of the one or more documents, and notifying the requestor that the request for signature approval has been rejected by one or more approvers; and generating a print out of the one or more documents on the image forming apparatus upon receipt of the notification from the remote server in accordance with the notification setting if the request for signature approval has been approved.

11. The computer program product of claim 10, wherein the image forming apparatus:

stores the one or more documents in a memory portion of the image forming apparatus;

places a signature box on the one or more documents;

generates the e-mail to the one or more approvers;

sends the e-mail to the one or more approvers; and provides e-mail notification to the requestor upon receipt of the notification from the remote server on the approval or rejection of the request from the one or more approvers.

12. The computer program product of claim 10, comprising:

hosting approval signatures for the one or more approvers on the remote server outside of the image forming apparatus.

13. The computer program product of claim 10, comprising:

merging approval signatures from the one or more approvers on the one or more document on the image forming apparatus upon receipt of the notification of approval from the remote server; and printing the one or more documents with a signature of each of the approvers on the image forming apparatus.

14. The computer program product of claim 10, comprising:

merging approval signatures from the one or more approvers on the one or more documents on the remote server upon receipt of approval from the one or more approvers; and sending the one or more documents with approval signatures to the image forming apparatus for printing.

15. An image forming system comprising:

a remote server; and an image forming apparatus connected to the remote server through a network connection, and wherein the remote server and the image forming apparatus perform the following steps:

inputting information of a requestor and one or more approvers into the image forming apparatus and requesting signature approval on one or more documents;

generating an e-mail from the image forming apparatus to the one or more approvers, wherein the e-mail requests the signature approval of the one or more approvers on the one or more documents;

forwarding the generated e-mail to the one or more approvers, wherein the one or more approvers can approve or reject the request for the signature approval from the requestor, the e-mail having approval and rejection icon;

sending the one or more documents to the remote server, wherein the remote server hosts the approval and rejection of the one or more documents;

forwarding the approval or rejection of the one or more documents from each of the one or more approvers to the remote server upon selection of an approval or a rejection icon on the e-mail;

processing the approval or rejection of each of the one or more approvers on the remote server and generating a notification on the remote server, which is forwarded to the image forming apparatus in accordance with a notification setting received from the image forming apparatus;

canceling the request for the signature approval on the image forming apparatus upon receipt of one or more rejections from the remote server such that the image forming apparatus does not generate a print out of the one or more documents, and notifying the requestor that the request for signature approval has been rejected by on or more approvers; and generating a print out of the one or more documents on the image forming apparatus upon receipt of the notification from the remote server in accordance with the notification setting if the request for signature approval has been approved.

16. The system of claim 15, wherein the image forming apparatus includes a scanner, which scans the one or more documents, and an e-mail creator, which generates the e-mail, which is forwarded to the one or more approvers.

17. The system of claim 15, comprising:

a client device, which generates the one or more documents for approval on a client device, and forwarding the one or more documents from the client device to the image forming device, which generates the e-mail based on the one or more documents received from the client device.

18. The system of claim 15, comprising a graphical user interface on the image forming apparatus configured to input information pertaining to the one or more approvers; and an employee database hosted on the image forming apparatus, wherein the employee database includes name, e-mail address and/or job title of the requester and the one or more approvers.

19. The system of claim 15, wherein the image forming apparatus performs the following:

stores the one or more documents in a memory portion of the image forming apparatus;

places a signature box on the one or more documents;

generates the e-mail to the one or more approvers;

sends the e-mail to the one or more approvers; and provides e-mail notification to the requestor upon receipt of the notification from the remote server on the approval or rejection of the request from the one or more approvers.

20. The system of claim 15, wherein the image forming apparatus, merges approval signatures from the one or more approvers on the one or more document on the image forming apparatus upon receipt of the notification of approval from the remote server; and prints the one or more documents with a signature of each of the approvers on the image forming apparatus.

* * * * *